(12) United States Patent
Barnes et al.

(10) Patent No.: US 7,481,153 B2
(45) Date of Patent: Jan. 27, 2009

(54) TOASTER HAVING VISUAL SHADE INDICATOR

(75) Inventors: John D. Barnes, Richmond, VA (US); Martin Patrick Brady, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 159 days.

(21) Appl. No.: 11/549,318

(22) Filed: Oct. 13, 2006

(65) Prior Publication Data

US 2008/0087174 A1    Apr. 17, 2008

(51) Int. Cl.
*A47J 37/08* (2006.01)
(52) U.S. Cl. .............................. 99/326; 99/331; 99/342; 99/389; 219/521
(58) Field of Classification Search ........... 99/326–333, 99/385–393, 341, 342, 493; 219/521–525, 219/400; 60/529; 337/354
See application file for complete search history.

(56) References Cited

U.S. PATENT DOCUMENTS

| | | | |
|---|---|---|---|
| 2,025,136 A | 12/1935 | Thomas | |
| 2,236,405 A | 3/1941 | Ireland | |
| 2,262,297 A | 11/1941 | Olson | |
| 2,337,124 A | 12/1943 | Olving | |
| 2,580,554 A * | 1/1952 | Kitto | 99/329 R |
| 2,595,283 A | 5/1952 | Mueller | |
| 2,597,805 A * | 5/1952 | Kitto | 99/329 R |
| 2,605,832 A | 8/1952 | Mueller | |
| 2,609,473 A | 9/1952 | Olson | |
| 2,667,351 A | 3/1954 | Riechold | |
| 2,764,081 A | 9/1956 | Glasser | |
| 2,879,707 A | 3/1959 | Ambrose | |
| 2,889,800 A | 6/1959 | Schroeder | |
| 3,828,559 A * | 8/1974 | Siemensma | 60/529 |
| 4,345,145 A | 8/1982 | Norwood | |

(Continued)

*Primary Examiner*—Timothy F. Simone
(74) *Attorney, Agent, or Firm*—Panitch Schwarze Belisario & Nadel LLP

(57) ABSTRACT

A toaster for heating a food stuff to a selected shade, includes a housing having at least one wall, at least one heating chamber within the housing for receiving the food stuff to be heated and at least one heating element for heating the food stuff in the heating chamber. A window is provided in the wall and a control knob is provided for controlling the time period that the food stuff is heated. The control knob is rotatable between a first end position at which the food stuff is heated for a short time period to provide a light food stuff shade, a second end position at which the food stuff is heated for a long time period to provide a dark food stuff shade and a plurality of intermediary positions between the first and second end positions it which the food stuff is heated for a selected time period between the short and long time periods to provide a food stuff shade between light and dark. A visual shade scale includes shades ranging from a light shade at a first end of the scale to a dark shade at a second end of the scale with increasingly darker shades when moving from the first end to the second end of the scale. The shade scale is movable with respect to the window by rotation of the control knob so that the shade of the scale which is aligned for display through the window corresponds to the expected food stuff shade after heating the food stuff for the selected time period.

10 Claims, 5 Drawing Sheets

U.S. PATENT DOCUMENTS

| | | |
|---|---|---|
| 4,382,175 A | 5/1983 | Huggler |
| 4,781,646 A | 11/1988 | Dibley |
| 5,054,382 A | 10/1991 | Ward et al. |
| 5,193,439 A | 3/1993 | Finesman et al. |
| D384,542 S | 10/1997 | Pena Angarita |
| 5,705,791 A | 1/1998 | Sutton et al. |
| D394,983 S | 6/1998 | Garrett et al. |
| D396,165 S | 7/1998 | Pena Angarita |
| 5,802,957 A | 9/1998 | Wanat et al. |
| D415,924 S | 11/1999 | Powel |
| D418,003 S | 12/1999 | Alonge et al. |
| D421,693 S | 3/2000 | Carbone |
| D424,861 S | 5/2000 | Hughes |
| D428,759 S | 8/2000 | Hughes |
| D431,147 S | 9/2000 | Lin |
| D436,792 S | 1/2001 | Parker et al. |
| 6,311,608 B1 | 11/2001 | Hardin et al. |
| 6,397,732 B1 | 6/2002 | Jenkins |
| D470,710 S | 2/2003 | Littmann |
| D473,094 S | 4/2003 | Aeshbacher |
| D477,495 S | 7/2003 | To |
| D488,341 S | 4/2004 | Enriquez et al. |
| D488,664 S | 4/2004 | Seum et al. |
| D490,267 S | 5/2004 | Berthier |
| 6,753,510 B2 | 6/2004 | Lile |
| 6,854,380 B2 | 2/2005 | Wanat |
| D502,839 S | 3/2005 | Cuffaro et al. |
| D503,305 S | 3/2005 | Bjorn |
| D503,581 S | 4/2005 | Wong et al. |
| D510,676 S | 10/2005 | Picozza et al. |
| 2005/0204927 A1 | 9/2005 | Boyle et al. |

* cited by examiner

TOASTER HAVING VISUAL SHADE INDICATOR

BACKGROUND OF THE INVENTION

The present invention relates to a toaster and, more particularly, to a toaster for heating or toasting a food stuff to a selected shade, the toaster including a window displaying a visual indicator for indicating the user selected shade to which the food stuff is expected to be heated or toasted.

Toasters are generally well known for the purpose of heating or toasting food stuff such as a piece of bread, a bagel, a toaster pastry, a toaster sandwich, or the like. A toaster typically includes a generally box-like housing with one or more slot-like openings in the top surface for receiving a food stuff to be toasted or heated. The food stuff is typically supported on a movable carriage within the housing and a control arm or lever is provided for lowering and locking the carriage supporting the food stuff into a heating or toasting chamber within the housing and for energizing one or more heating elements for heating or toasting the food stuff within the heating chamber. Typically a control knob is provided on an outer surface of the toasting housing. The control knob may be actuated by a user for controlling the amount of time that the food stuff is heated or toasted to thereby control the degree of heating or toasting of the food stuff. For example, when the control knob is in the first, typically full counter-clockwise position, the food stuff is only heated or toasted for a relatively short period of time so that when the food stuff emerges from the toaster, it is toasted to only a light shade. Typically, as the control knob is rotated to the clockwise direction, the amount of time that the food stuff is heated or toasted increases accordingly as does the degree of darkness of the food stuff as it emerges from the toaster. When the heating or toasting time established by the control knob expires, the heating elements are de-energized and the carriage is released and moves upwardly under the bias of a spring to move the heated or toasted food stuff out of the opening in the top surface of the toaster for consumption.

The present invention comprises a toaster having a visual indicator for indicating to a user the expected shade of a food stuff, such as toast, emerging from the toaster when the control knob is set to a selected position. The visual indicator is in the form of a window with a visual shade scale movable with respect to the window by rotation of the control knob. The shade scale includes food stuff or toast shades ranging from a light shade to a dark shade. In this manner, when the control knob is set to a first end position to provide for a short time period to heat or toast the food stuff, the shade which appears in the window is a light shade. Correspondingly, when the control knob is set substantially clockwise to provide or a long period of heating or toasting of the food stuff; the shade which appears in the window is a dark shade. In this manner, a user is better able to adjust the control knob for controlling the time that a food stuff is heated or toasted to a desired visual shade which appears in the window.

BRIEF SUMMARY OF THE INVENTION

Briefly stated, a toaster is provided for heating food stuff to a selected shade, the toaster having a housing including at least one wall, at least one heating chamber within the housing for receiving the food stuff to be heated and at least one heating element for heating the food stuff in the heating chamber. The toaster includes a window in the housing wall. A control knob is provided for controlling the time period that the food stuff is heated, the control knob being rotatable between a first end position at which the food stuff is heated for a short time period to provide a light food stuff shade, a second end position at which the food stuff is heated for a long time period to provide a dark food stuff shade and a plurality of intermediary positions between the first and second end positions at which the food stuff is heated for a selected time period between the short and long time periods to provide a food stuff shade between light and dark. The toaster further includes a visual shade scale including shades ranging from a light shade at a first end of the scale to a dark shade at a second end of the scale within increasingly darker shades when moving from the first end to the second end of the scale. The shade is movable with respect to the window by rotation of the control knob so that the shade of the scale which is aligned for display through the window corresponds to the expected food stuff shade after heating the food stuff for the selected time period.

In another embodiment, the present invention comprises a toaster for toasting a food stuff to a selected shade. The toaster has a housing including at least one wall, at least one toasting chamber within the housing for receiving the food stuff to be toaster and at least one heating element for toasting the food stuff in the heating chamber. The toaster also includes a window in the wall. A control knob is provided for controlling the time that the food stuff is toasted, the control knob being rotatable between a first end position at which the foods stuff is toasted for a short time period to provide a light food stuff toast shade, a second end position at which the food stuff is toasted for a longer time period to provide a dark food stuff toast shade and a plurality of intermediary positions between the first and second end positions at which the food stuff is toasted for a selected time period between the short and long time periods to provide a food stuff toast shade between light and dark. The toaster also includes a visual shade scale including shades ranging from a light shade at a first end of the scale to a dark shade at a second end of the scale with increasingly darker shades when moving from the first end to the second end of the scale. The scale is movable with respect to the window by rotation of the control knob so that the shade of the scale, which is aligned for display through the window, corresponds to the expected food stuff toast shade for the selected time period.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
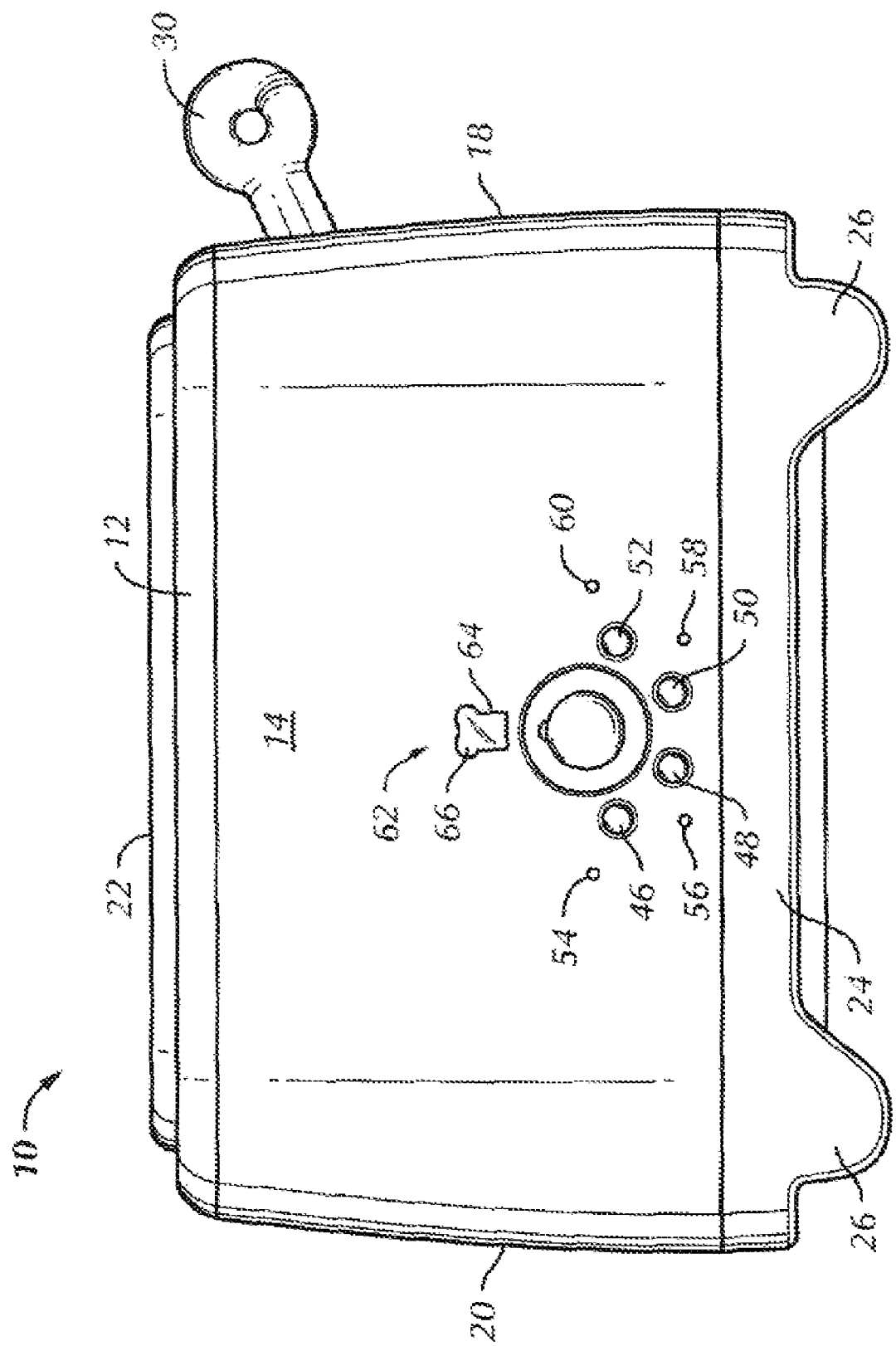
FIG. 1 is a front elevational view of a toaster having a visual shade indicator in accordance with a preferred embodiment of the present invention.
Figure 6:
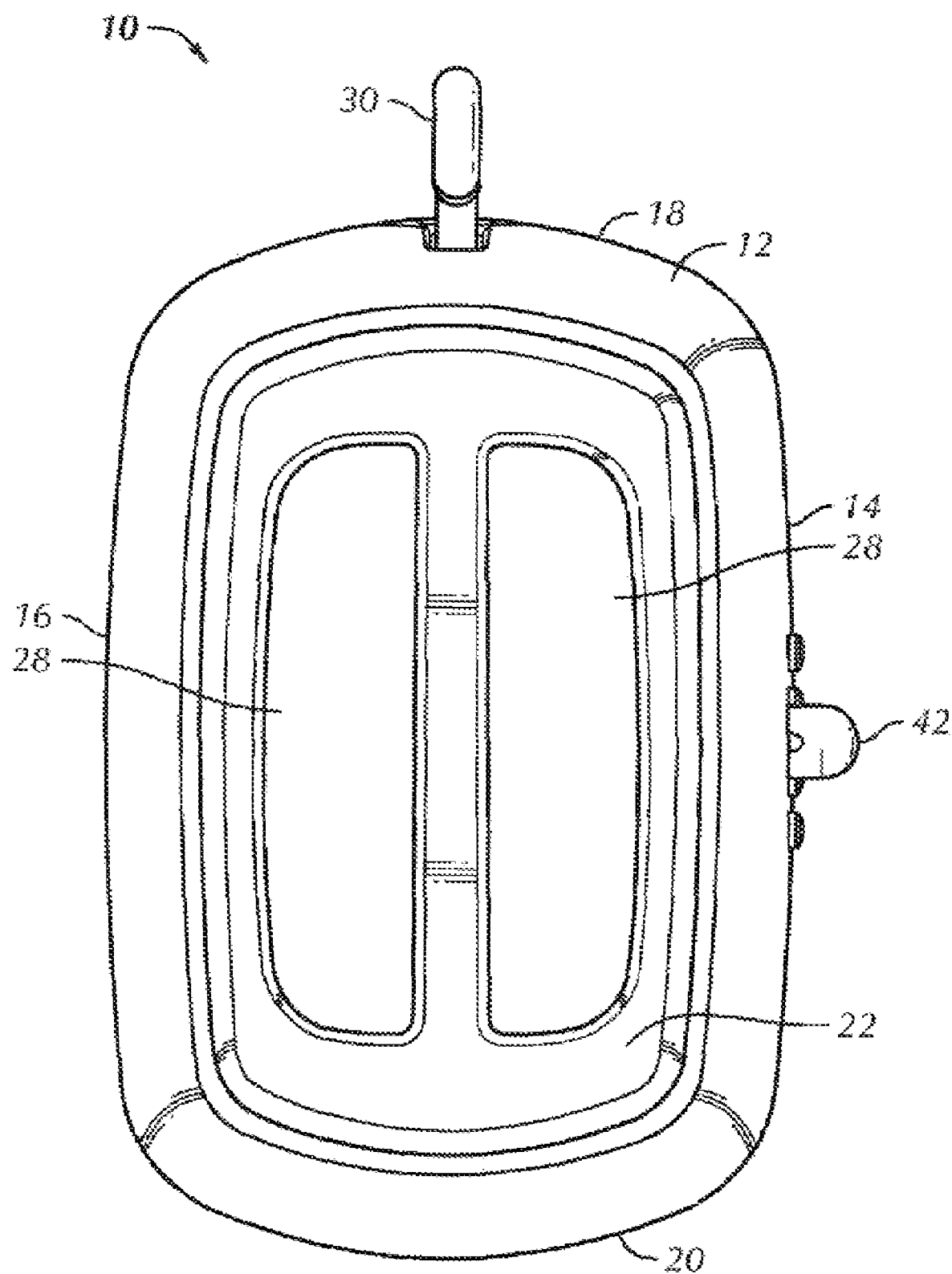
FIG. 6 is a top plan view of the toaster shown in FIG. 1.
Figure 7:
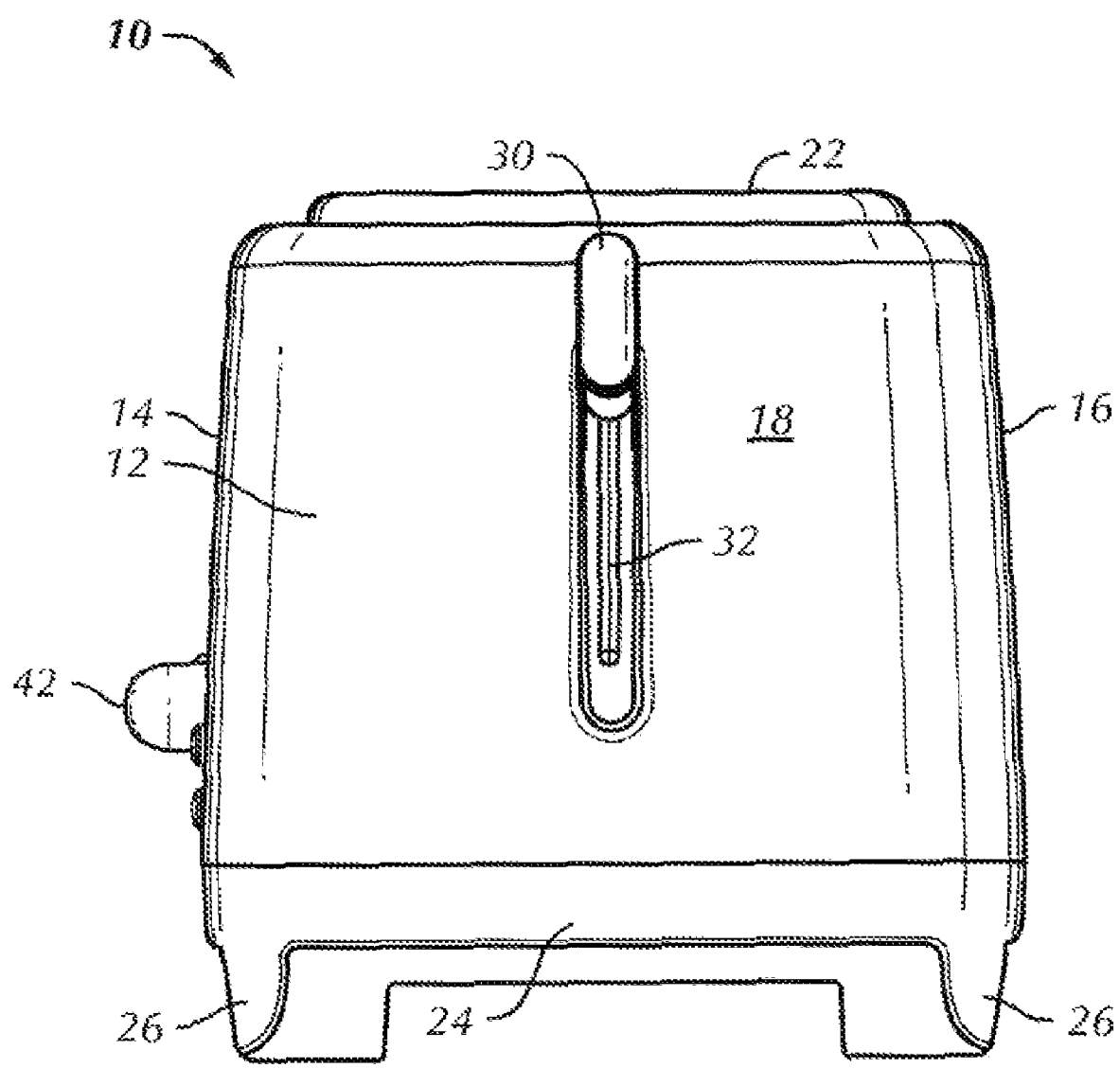
FIG. 7 is a right side elevational view of the toaster shown in FIG. 1.

Referring to the drawings, wherein the same reference numerals are used to indicate the same components throughout the several figures, there is shown in FIGS. 1, 6 and 7 a toaster, generally 10, in accordance with a preferred embodiment of the present invention. With the exception of the below described components relating to the visual shade indicator, the toaster 10 is generally of a type well known to those of ordinary skill in the art and is generally commercially available from a variety of manufacturers. As shown, the toaster 10 is comprised of a generally box-like housing 12 including a front wall 14, a rear wall 16 a right side wall 18, a left side wall 20 and a top wall 22. The walls, 14, 16, 18, 20 and 22 are interconnected as shown with generally smooth corner transitions to provide a pleasing overall appearance to the toaster 10. Preferably, the housing 12 is made of a lightweight relatively high strength material such as aluminum steel, chrome, or the like. Alternatively, the housing 12 could be formed of a polymeric or some other suitable material. As shown in FIGS. 1 and 7 the housing 12 is supported on a generally tray-like base 24 having four generally downwardly extending leg-like portions 26 proximate to the four corners thereof. The base 24 is preferably made of a polymeric material but could be made of any other suitable material.

As shown in FIG. 6, the top wall 22 of the housing 12 includes at least one and, in the present embodiment, a pair of generally parallel spaced apart slot-like openings 28. Preferably, each of the slot-like openings 28 is of a sufficient length and width for receiving a variety of different food stuffs, including bread, English muffins, bagels, toaster sandwiches, etc., for heating or toasting by the toaster 10. The interior of the housing 12 further includes a carriage (not shown) positioned generally beneath each of the slot-like openings 28. The carriage is of a type well known in the toaster art and is movable from a first or upper position at which a food stuff which has been placed on the carriage extends at least partially out of the corresponding slot-like opening 28 and a second or lower position at which at least a substantial portion of a food stuff supported by the carriage is contained within the housing 12 for the heating or toasting operation. Downward movement of the carriage is controlled by a lever actuator 30 which, as shown in FIGS. 1, 6 and 7, extends outwardly form the housing 12 through a slot-like opening 32 through the right side wall 18 in a manner well known in the toaster art. A carriage latch 29 (shown schematically in FIG. 5) is provided within the housing 12 for retaining the carriage in the lower position during a heating or toasting cycle. The carriage latch 29 may be mechanical, magnetic or the like as is well known in biasing member or mechanism (not shown) so that when a heating or toasting cycle has been completed, and the carriage latch 29 releases the carriage, the carriage moves to the upper position so that the heated or toasted food stuff may be removed from the toaster 10 through the slot-like openings 28.

The housing 12 further includes a heating chamber (not shown) established in the area where the food stuff is located when the carriage is in the lower position. In the present embodiment, the housing 12 includes two such heating chambers, one associated with and generally beneath each of the slot-like openings 28. Each of the heating chambers includes a pair of heating elements 34, 36, 38 and 40 (FIG. 5) with one of the heating elements 34, 36, 38, 40 being generally located on each lateral side of each of the slot-like openings 28. In this manner, both lateral sides of a food stuff located within a heating chamber may be simultaneously heated or toasted. The use of a pair of heating chambers each having two heating elements 34, 36, 38, 40 as described is typical of toasters well known in the art.

The toaster 10 further includes a control knob 42 located on the outside of the housing 12, in the present embodiment on the front wall 14 of the housing 12. The control knob 42 is rotatable by a user in either a clockwise or counterclockwise direction in a manner typical of control knobs of toasters well known in the art. The control knob 42 is connected through suitable circuit components, such a potentiometer (not shown) or other such device to a controller 44 (see FIG. 5) located within the housing 12. The controller 44 functions for controlling the below-described operations of the toaster 10 in a manner well-known to those of ordinary skill in the toaster art. The control knob 42 in conjunction with the controller 44 basically controls the amount of time that a food stuff is heated or toasted within a heating chamber by the heating elements 34, 36, 38, 40. Turning the control knob 42 in the counterclockwise direction shortens the time period that the food stuff is heated or toasted and turning the control knob 42 in the clockwise direction lengthens the time that the food stuff is heated or toasted.

Figure 4:
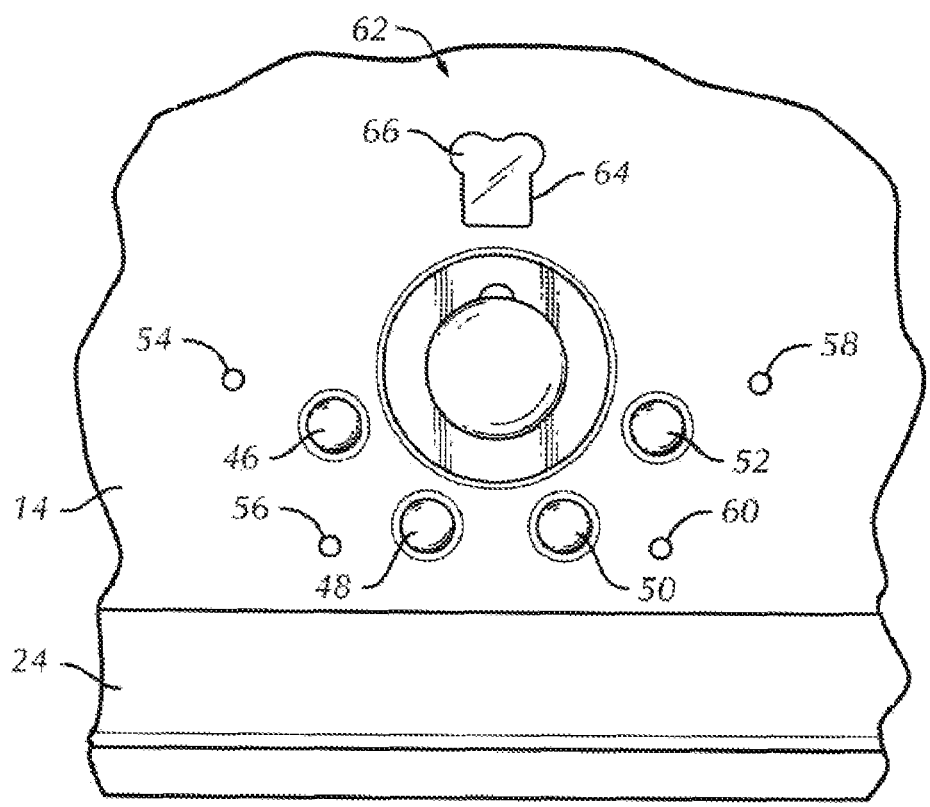
FIG. 4 is a greatly enlarged fragmentary view of a portion of the toaster shown in FIG. 1.
Figure 5:
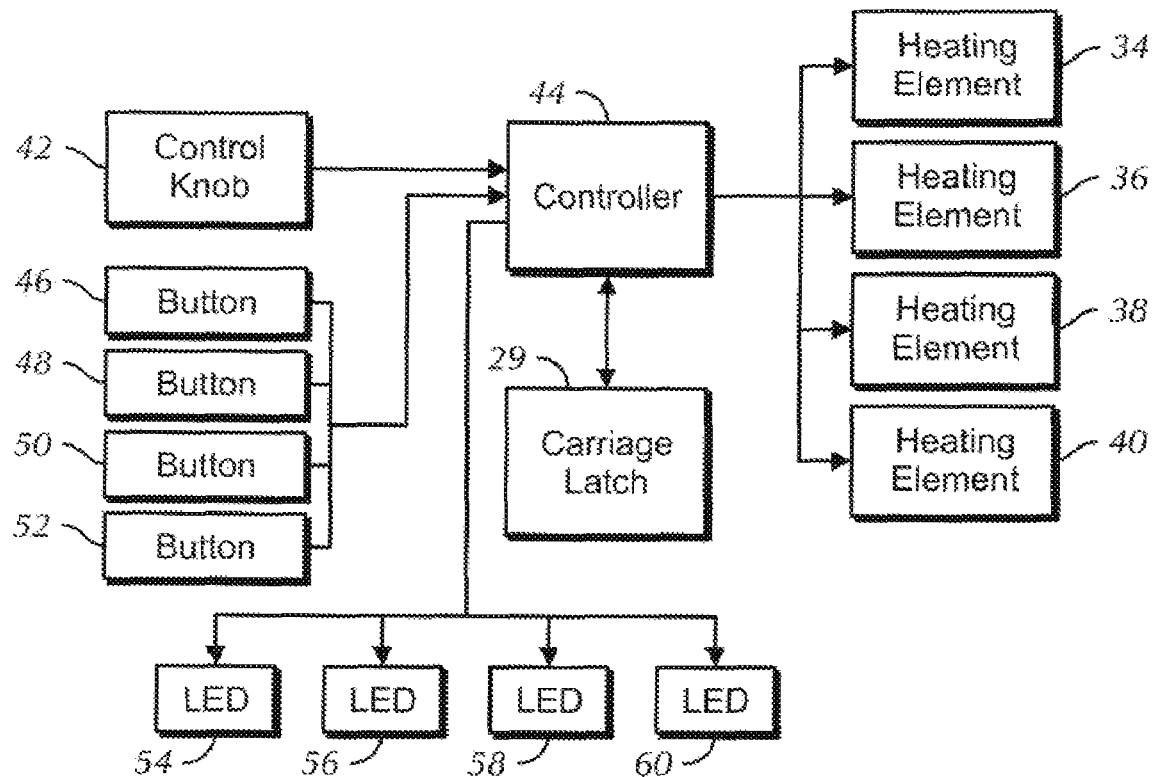
FIG. 5 is a schematic block diagram of the control features of the toaster shown in FIG. 1.

As best shown FIGS. 1, 4 and 5, the toaster 10 further includes a plurality of individual control buttons 46, 48, 50, 52. The control buttons 46, 48, 50, 52, are of a type well known in the toaster art for controlling individual functions of the toaster 10. For example, one of the control buttons, 46, 48, 50, 52 could be a "bagel" button which causes the controller 44 to actuate only one of the heating clement 34, 36, 38, 40 associated with each of the slot-like openings 28 for heating or toasting only one side of a bagel. Other control buttons may include a "defrost" button, a "reheat" button and a "cancel" button which causes the controller 44 to effectively stop any heating or toasting cycle and to cause the carriage latch 29 to release the carriage which moves to the upper position. Light emitting diode (LED) indicators 54, 56, 58, 60 associated with each of the control buttons 46, 48, 50, 52 indicate when a control button 46, 48, 50, 52 has been depressed by a user.

The toaster 10 as thus far shown and described is typical of a two-slice toaster of the type well known to those of ordinary skill in the art. In operation, a user places a food stuff, such as a piece of bread to be heated or toasted through either or both of the slot-like openings 28 and onto the supporting carriage. The user then selects the time for the heating or toasting cycle by rotating the control knob 42 to a selected position. Typically, a heating or toasting cycle of less time results in less heating of the food stuff or toasting of the food stuff to a lighter shade, whereas a heating or toasting cycle of an increased time results in more heating of the food stuff or toasting of the food stuff to a darker shade. If appropriate, the user selects and depresses one of the control buttons 46, 48, 50 or 52. Thereafter, the user pushes the actuator 30 downwardly to lower the carriage into the housing 12 to the lower position and thereby move the food stuff into a heating chamber. The downward movement of the actuator 30 results in the carriage latch 29 latching the carriage in the lower position and the controller 44 initiating the heating to toasting cycle by energizing one or more of the heating elements 34, 36, 38, 40. Once the heating or toasting cycle has been completed, the controller 44 de-energized heating element or elements 34, 36, 38, 40 and causes the carriage latch 29 to release the carriage so that the bias associated with the carriage moves the carriage to the upper position to thereby expose the heated or toasted food stuff for removal through the slot-like openings 28. The heating or toasting cycle may be appropriately modified if one of the control buttons 46, 48, 50 52 is depressed by the user.

Figure 2:
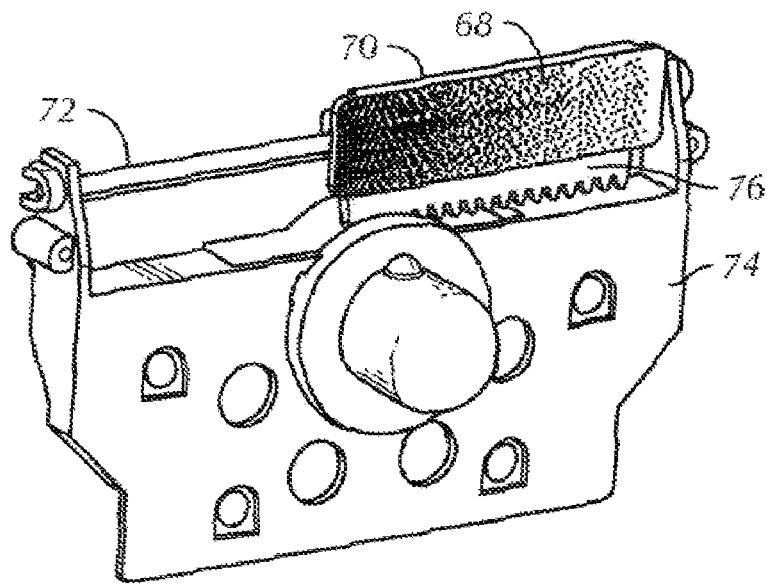
FIG. 2 is a front perspective view of a mechanism for moving a visual shade scale in accordance with the embodiment of the toaster shown in FIG. 1.
Figure 3:
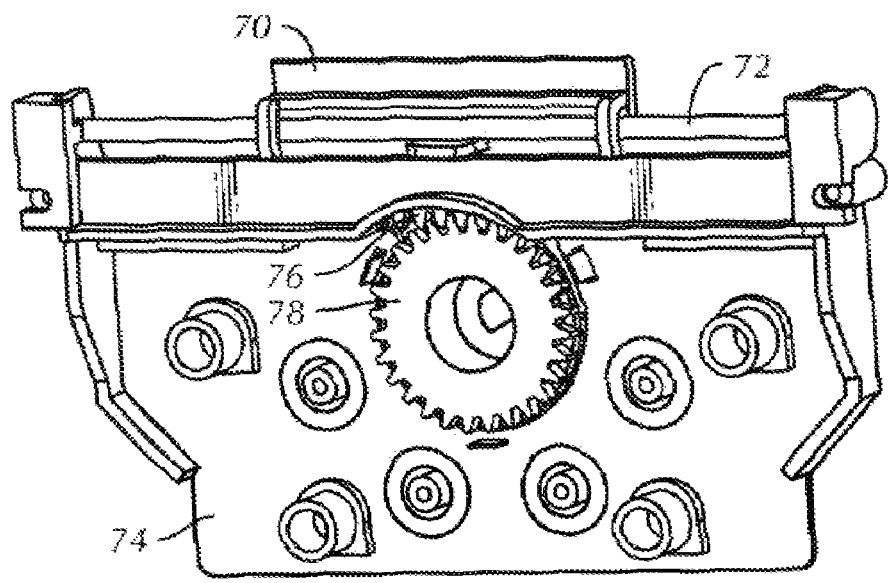
FIG. 3 is a rear elevational view of the mechanism shown in FIG. 2.

The present invention comprises an improvement upon the above-described well-known prior art toaster by providing to the user a visual indication of the expected shade of the food stuff upon completion of the heating to toasting cycle. Referring to FIGS. 1 and 4, to accomplish this result, a window 62 is provided in the from wall 14 of the toaster housing 12. The window 62 is preferably comprised of a generally square-shaped opening 64 extending through the front housing wall 14 with a transparent cover 66 over the opening 64. Preferably, the cover 66 is formed of a transparent polymeric material. However, it will also be appreciated by those of skill in the art that other materials may alternatively be employed for the cover 66. It will also be appreciated by those skilled in the art that the window 62 may not be generally square-shaped, if desired and may be located elsewhere on the housing 12. Located within the housing 12 is a visual shade scale 68 as best shown in FIG. 2. The shade scale 68 is generally linear and includes a plurality of color shades ranging from a light color shade at a first or right end of the scale 68 to a dark color shade at a second or left end of the scale 68 with increasingly darker shades when moving along the scale 68 from the first end to the second end. As shown in FIGS. 2 and 3, the shade scale 68 is located on a generally rectangularly shaped, generally elongated member 70 which is supported for leftward or rightward lateral movement by an elongated rod 72. The elongated rod 72 is in turn supported by a support member 74 which is located within the housing 12 proximate to the interior surface of the front wall 14 so that the shade scale 68 faces and is aligned with the window 62. The support member 74 as shown in FIGS. 2 and 3 includes openings that help to support the control knob 42, the control buttons 46, 48, 50, 52 and the LED indicators 54, 56, 58, 60.

The rectangular member 70 including the shade scale 68 is movable with respect to the window 62 by rotation of the control knob 42 so that the color shade of the shade scale 68, which is aligned for display through the window 62, corresponds to the expected shade of the food stuff after the food stuff is heated or toasted for the time period selected by the control knob 42. In the present embodiment, the rectangular member 70 includes a rack 76 along at least one surface, and preferably the lower surface, as best shown in FIG. 2. Correspondingly, the portion of the control knob 42 within the housing 12 includes a pinion 78. The teeth of the rack 76 mesh with the teeth of the pinion 78 so that rotational movement of the control knob 42 causes corresponding translational lateral movement of the rectangular member 70. Thus, when the control knob 42 is rotated all the way in the counterclockwise direction to a first end position, the operation of the pinion 78 and rack 76 causes the rectangular member 70 to move to the extreme left most position as shown in FIG. 2 so that the lightest shade of the shade scale 68 is aligned for display through the window 62. Correspondingly, when the control knob 42 is rotated all the way in the clockwise direction to the second end position, the operation of the pinion 78 and rack 76 causes the rectangular member 70 to move to the extreme right most position when viewing FIG. 2, so that the darkest shade of the shade scale is aligned for display through the window 62. In this manner, the user is able to turn the control knob 42 in such a manner that the desired shade of the heated or toasted food stuff on the shade scale 68 appears for viewing through the window 62. The control knob 42, through the actions of the controller 44, controls the timing of the heating or toasting cycle so that the food stuff, once heated or toasted, emerges from the toaster 10 having a shade corresponding to the shade of the shade scale 68 which appears in the window 62. It will be apparent to those of ordinary skill in the art while the present embodiment employs a rack and pinion for movement of the shade scale 68 with respect to the window 62 in coordination with the control knob 42, other mechanisms or devices may alternatively by employed for movement of the shade scale 68 with respect to the window 62 for displaying an expected shade of a heated or toasted food stuff which corresponds to the selected location of the control knob 42.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A toaster for heating a foodstuff to a selected shade, the toaster having a housing including at least one wall, at least one heating chamber within the housing for receiving the foodstuff to be heated and at least one heating element for heating the foodstuff in the heating chamber, the toaster comprising:

a window in the wall;

a control knob for controlling a time period that the foodstuff is heated, the control knob being rotatable between a first end position at which the foodstuff is heated for a short time period to provide a light foodstuff shade, a second end position at which the foodstuff is heated for a long time period to provide a dark foodstuff shade and a plurality of intermediary positions between the first and second end positions at which the foodstuff is heated for a selected time period between the short and long time periods to provide a foodstuff shade between light and dark; and a visual shade scale including shades ranging from a light shade at a first end of the scale to a dark shade at a second end of the scale with increasingly darker shades when moving from the first end to the second end of the scale, the scale being movable with respect to the window by rotation of the control knob so that the shade of the scale which is aligned for display through the window corresponds to the expected foodstuff shade after heating the foodstuff for the selected time period.

2. The toaster as recited in claim 1 wherein the shade scale is generally linear.

3. toaster as recited in claim 2 wherein the shade scale is located on an elongated member proximate to an inside surface of the wall, the member being movable for alignment of the shades with the window.

4. The toaster as recited in claim 3 wherein the elongated member is supported for movement by an elongated rod.

5. The toaster as recited in claim 4 wherein the elongated member includes a rack having teeth along at least one surface and the control knob includes a pinion having teeth, the pinion teeth engaging the rack teeth for moving the elongated member along the rod upon rotation of the control knob.

6. The toaster as recited in claim 5 wherein the window comprises an opening in the wall with a transparent cover over the opening.

7. The toaster as recited in claim 6 wherein the cover is comprised of a polymeric material.

8. The toaster as recited in claim 7 wherein the window is generally square.

9. A toaster for toasting a foodstuff to a selected shade, the toaster having a housing including at least one wall, at least one toasting chamber within the housing for receiving the foodstuff to be toasted and at least one heating element for toasting the foodstuff in the heating chamber, the toaster comprising:

a window in the wall;

a control knob for controlling a time period that the foodstuff is toasted, the control knob being rotatable between a first end position at which the foodstuff is toasted for a short time period to provide a light foodstuff toast shade, a second end position at which the foodstuff is toasted for a long time period to provide a dark foodstuff toast shade and a plurality of intermediary positions between the first and second end positions at which the foodstuff is toasted for a selected time period between the short and long time periods to provide a foodstuff toast shade between light and dark; and a visual shade scale including shades ranging from a light shade at a first end of the scale to a dark shade at a second end of the scale with increasingly darker shades when moving from the first end to the second end of the scale, the scale being movable with respect to the window by rotation of the control knob so that the shade of the scale which is aligned for display through the window corresponds to the expected foodstuff toast shade for the selected time period.

10. The toaster as recited in claim 9 wherein the shade scale is located on an elongated member proximate to an inside surface of the wall, the member being supported for movement by an elongated rod, the member including a rack having teeth along at least one surface and the control knob including a pinion having teeth, the pinion teeth engaging the rack teeth for moving the elongated member along the rod upon rotation of the control knob.

* * * * *